Aug. 31, 1948.   H. C. DOHRMANN   2,448,424
DUST COLLECTOR
Filed Oct. 11, 1945
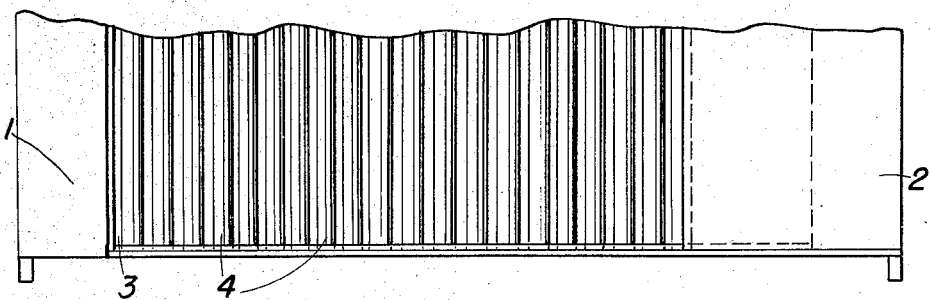
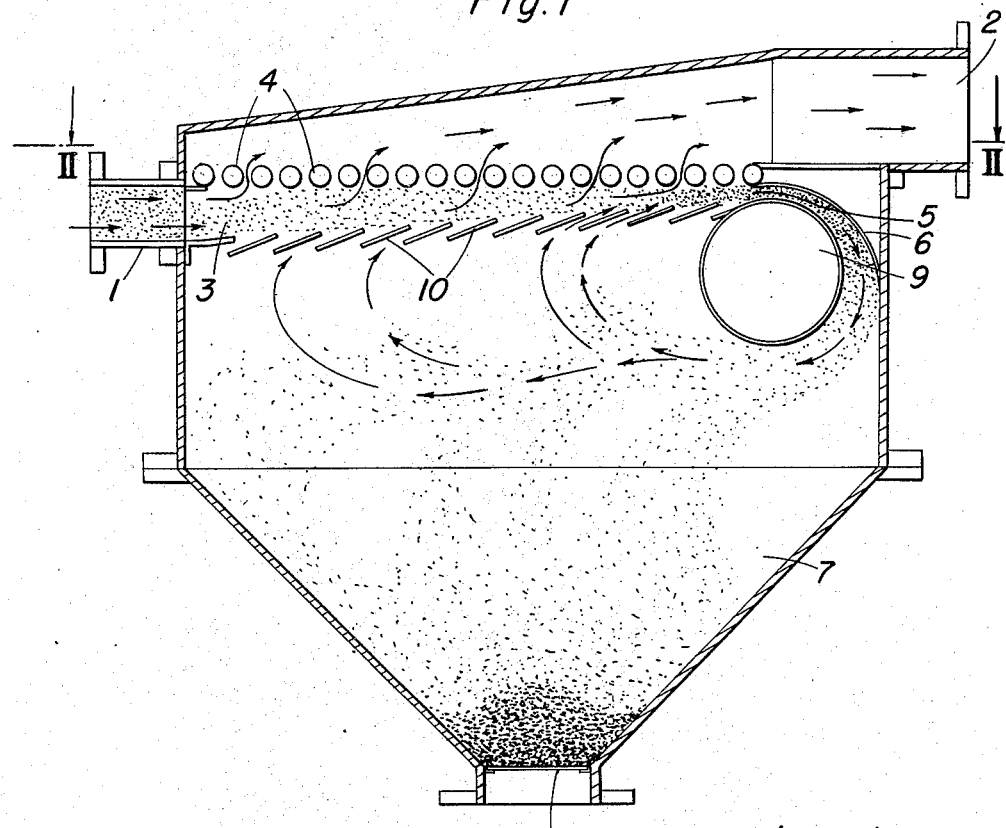
Inventor
Henry C. Dohrmann
By his Attorneys
Howson and Howson Patented Aug. 31, 1948

2,448,424

UNITED STATES PATENT OFFICE 2,448,424

DUST COLLECTOR

Henry C. Dohrmann, Jersey City, N. J., assignor to Buell Engineering Company, Incorporated, New York, N. Y., a corporation of Delaware Application October 11, 1945, Serial No. 621,747

8 Claims. (Cl. 183—110)

This invention is for a dust collector and more particularly one which will operate without the use of a blower or a cyclone separator. This collector is intended more particularly for small boiler installations which operate on natural draft, such for example as are found in apartment houses, office buildings and small industrial plants. Dust collectors of the industrial type usually cause loss of pressure in the boiler flues which makes it impossible to use such collectors in plants where only natural draft is available. The novel collector about to be described offers very low resistance to the gases and has marked efficiency in separating the dust. It is characteristic of this collector that the gases which carry off the concentrated dust are led back into the main separating or flow passage after they drop the dust by means of vanes separated from the clean gas outlet by the full width of the passage.

The invention will be shown and described embodied in a wedge-type separator and for an example of this general type of separator reference is made to the Van Tongeren Patent 2,265,091, dated Dec. 2, 1941.

In the drawings—

Fig. 1 is a vertical sectional view of a preferred embodiment of a dust collector.

Fig. 2 is a fragmentary plan view on the line 2—2 of Fig. 1 and shows the row of spaced, parallel bars through which the main separation of gases and dust takes place in a collector made in accordance with my invention.

As shown in Fig. 1, the dust and gases enter through an inlet 1 coming from the boiler flue, and exit through an outlet 2 shown at the upper right of the figure. The normal cross-sectional area of the boiler flue is equal to the cross-sectional area of the outlet 2. From the inlet the gases pass into the main channel or flow passage 3. This flow passage is tapered from a cross-sectional area at the inlet, which is equal to the inlet, to an area at the other end which is very much less. In the example shown in the drawings the taper is formed on top by a row of spaced bars 4 lying horizontally and tangentially across the path of the gases in the passage, thereby forming one side of the passage. The openings between these bars connect the flow passage 3 to the outlet 2 and permit escape of the clean gas to the outlet. The bottom of the passage slopes upwardly, thereby gradually reducing the cross-sectional area from the inlet to the far end of the passage. The slot or shaveoff 5 between the last bar 4 and the bottom of the passage 3 preferably extends for the full width of the passage but is quite low. In extension of the top of the passage beyond the bars is a curved surface 6 which serves to deflect downwardly into a dust bin 7 whatever reaches the end of the passage. This dust bin is normally closed but has a slide 8 at the bottom to let out accumulations of dust periodically. It will be observed that the dust bin is large relatively to the inlet 1 and main flow passage 3. Forming the lower wall of the dust slot 5 opposite to the curved surface 6 is one face of a cylinder 9 which forms a continuous curved surface leading into the dust bin. This cylinder leads around to the lower side of the bottom of the main passage. One of the principal features of the construction and operation of the collector centers around this bottom of the main flow passage. Instead of being a smooth closed plate, the bottom has in it one or more narrow openings, vanes or louvres 10 connecting the top of the dust bin 7 with the main flow passage. It improves this feature if the vanes are sloped so that gas passing from the dust bin to the flow passage enter at an acute angle in the direction of flow of the gases in the main passage, i. e., inclined in the direction of flow in the main passage.

I will now explain how my collector works. In Figure 1 of the drawings the flow of the gases is indicated by arrows and the flow of the dust by stippling. The dust laden gases coming from the boiler are restricted by the size of the inlet 1 and move through the inlet 1 and main flow passage 3 at increased velocity. As explained in detail in the above-mentioned Patent 2,265,091 as the dust-laden gases pass through the main flow passage they come in contact with the row of closely spaced cylindrical rods 4 which form a tangential wall and separate the main flow passage 3 from the outlet 2. The spacing of the rods is explained in Patent 2,265,091 and is such that nearly all the gases turn and pass between the rods into the outlet while the dust is kept in the main flow passage by the bars, and to some extent by gravity, and is pushed along to the end of the passage by the remaining gases. At the shaveoff 5 the dirty fraction of the gases, i. e., concentrated dust with the remaining gases, passes into the dust bin and immediately loses velocity. These remaining gases constitute about 10% of the total. The dust settles to the bottom of the bin and the gases move toward the vanes 10 where the fast moving gases in the main flow passage suck i. e., aspirate, the clean gases back into the flow passage. As one result of this recirculation the exit of the gases between the rods 4 is increased and as much gas flows between the rods as enters the inlet. It should also be noted that the re-entry of the cleaned gases through the vanes reduces the friction of the dust-laden gases on the bottom of the main flow passage and helps to carry the dust to the shaveoff. It will be observed that there is only one point of entrance and one point of exit for the gases. It should also be noted that the accelerated pace of the gases is maintained only from the inlet 1 to the shaveoff 5 and that in the dust bin 7 and outlet 2 the pressure of the gas and its speed are kept low. This manner of recirculating the gas aids the flow toward the shaveoff to the extent that the gases flow naturally from the dust bin to the main passage. In these ways the loss of pressure in the collector is minimized and it is practical to do away with blowers and cyclone separators while still getting a high efficiency in dust separation.

It should also be noted that by returning the cleaned gases from the dust bin into the foul stream of gases that portion of the gases is cleaned a second time by the bars.

I claim:

1. In a dust collector, an inlet for the dust-laden gases, an outlet of larger capacity for the cleaned gases, and a flow passage connected to the inlet, there being openings in one wall of said passage to permit escape of gases to the outlet, in combination with a dust outlet in the passage for the concentrated dust-laden gases, a closed dust bin connected to the dust outlet, there being openings located in the wall opposite to the wall containing the openings for the escape of the gas, said openings leading from the dust bin back into the flow passage.

2. In a dust collector, an inlet for the dust-laden gases, an outlet of larger capacity for the cleaned gases, a tapered passage connected at its wide end to the inlet and exhaust openings in one wall of said passage permitting gases to escape into the outlet, in combination with a dust outlet at the end of the passage for the concentrated dust-laden gases, a closed dust bin connected to the dust outlet and vanes leading from the bin back into the tapered passage at a point prior to the dust outlet these recirculating vanes being located in the wall opposite to the wall containing the exhaust vanes.

3. In a wedge-type dust collector, an intake for the dust-laden gases, an outlet of larger capacity for the cleaned gases, and a flow passage connected to the inlet, in combination with exhaust openings in one wall of said passage permitting gases to escape between them to the outlet, a dust outlet at the end of the flow passage for the concentrated dust-laden gases, a closed dust bin connected to the dust outlet and narrow vanes opposite the exhaust openings and in the opposite wall leading from the bin back into the flow passage at an angle inclined at a direction of movement of the gases in the passage.

4. In a dust collector, an inlet for the dust-laden gases, an outlet of larger capacity for the cleaned gases, a tapered passage connected at its wide end to the inlet and of no greater capacity than the inlet to which it is connected, and exhaust openings in the top wall of said passage permitting gases to escape into the outlet, in combination with a dust outlet at the end of the passage for the concentrated dust-laden gases, a closed dust bin connected to the dust outlet and vanes leading from the bin back into the bottom of the tapered passage at a series of points lengthwise of the flow passage prior to the end of the gas exhaust vanes.

5. In a dust collector an inlet for the dust-laden gases, a wedge-shaped flow passage connected thereto having a row of closely spaced rods forming one wall of the passage and an outlet of greater capacity than the flow passage connected to the row of rods, in combination with a dust bin of greater capacity than the flow passage, a dust slot connecting the dust bin to the passage at the end opposite to the inlet, and vanes in the flow passage connecting the dust bin to the passage in the wall opposite the row of rods.

6. In a dust separator having a flow passage for the dust-laden gases and an outlet for the cleaned gas, a wall separating the passage and outlet tangential to the dust-laden stream flow and composed of cylindrical rods, the axis of each standing at right angles to said flow, and said rods being spaced apart not more than half the diameter of each rod, in combination with a dust outlet at the end of the flow passage, a closed dust bin connected to the dust outlet, there being openings in the flow passage leading from the dust bin back into the flow passage at a point opposite the rods.

7. In a dust separator having a flow passage for the dust-laden gases and an outlet for the cleaned gas, a wall separating the passage and outlet tangential to the dust-laden stream flow and composed of cylindrical rods, the axis of each standing at right angles to said flow, and said rods being spaced apart not more than half the diameter of each rod, in combination with a dust outlet at the end of the flow passage, a closed dust bin connected to the dust outlet and vanes leading from the dust bin back into the flow passage at an angle inclined in the direction of flow in the passage and at a point opposite the rods.

8. In a dust collector, an outlet for cleaned gases, a flow passage separated therefrom by a tangential wall having a plurality of openings therein, said wall adapted to separate gases from the dust and to turn said gases into the outlet, in combination with a closed dust bin connected to the flow passage and adapted to take the dirty fraction of the gases from the passage and allow the dust to settle, there being a plurality of aspirating openings in a wall between the bin and passage allowing the gases thus freed of dust to re-enter the flow passage at a point prior to the connection between the bin and passage, said aspirating openings being spaced from and located opposite the openings in said tangential wall, whereby air entering said flow passage from said bin through said aspirating openings is forced to cross the flow passage and to pass through the openings in said tangential wall to reach the outlet for the cleaned gases.

HENRY C. DOHRMANN.

REFERENCES CITED

The following references are of record in the file of this patent:

UNITED STATES PATENTS

| Number | Name | Date |
|---|---|---|
| 1,769,182 | Kohlemeier | July 1, 1930 |
| 2,265,091 | Van Tongeren | Dec. 2, 1941 |
| 2,265,707 | Wall | Dec. 9, 1941 |

FOREIGN PATENTS

| Number | Country | Date |
|---|---|---|
| 545,267 | Great Britain | May 18, 1942 |